7494X
No Printed Specification Available
F. Wingate
Protecting & Securing Hay.
No.
Patented Mar. 19, 1833.
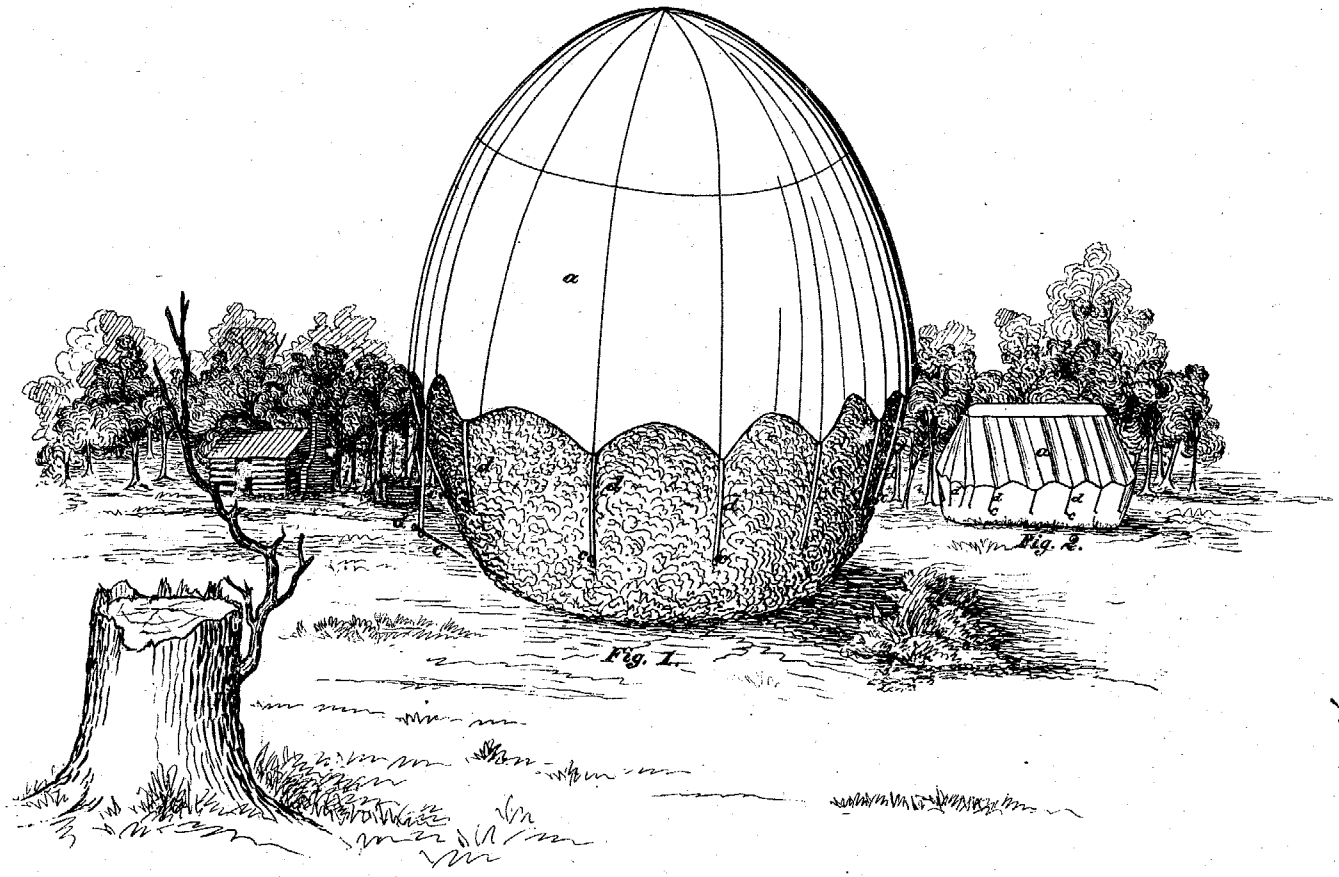

3/19/1833 1474X

Mar. 19. 1833 125.

Francis Wingate of Hallowell Maine

Letters Patent.

The Schedule referred to in these Letters Patent and making part of the same containing a description in the words of the said Francis Wingate himself of the improvement being a mode of Protecting and securing Hay and grain from the weather.

Be it Known that I Francis Wingate of Hallowell in the County of Kennebeck and State of Maine have invented a new and useful improvement in the covering for preserving Hay and grain. and securing them from the weather, and the following is a full and exact description of the construction and operation of the said covering as invented or improved by me. The covering is to be of cotton, tow, or other cloth to be covered with oil and paint or tar and other composition so as to entirely shed water. The dimensions of the covering are to be governed by the quantity to be covered, varying according to the size of the stack. cock or shock and it may be round or square. I take lines and loops at the edges, the lines, to be fastened to pegs prepared to secure the covering by thrusting the pegs into the hay or grain to keep it close that it may shed water. What I claim as new and as my own improvement is the application of the above described covering to the preservation of Hay and grain in Stacks in cocks, & shocks. Exd

W.C.

Witnesses
Jno Otis
Jos Wingate

Francis Wingate.

247

[illegible]